US010545724B2

(12) United States Patent
De Vaan et al.

(10) Patent No.: US 10,545,724 B2
(45) Date of Patent: Jan. 28, 2020

(54) METHOD AND APPARATUS FOR PROXIMITY DETECTION FOR DEVICE CONTROL

(71) Applicant: SIGNIFY HOLDING B.V., Eindhoven (NL)

(72) Inventors: Adrianus Johannes Stephanus Maria De Vaan, 'S-Hertogenbosch (NL); Jan Van Wijgerden, Leende (NL); Johan-Paul Marie Gerard Linnartz, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/546,698

(22) PCT Filed: Dec. 30, 2015

(86) PCT No.: PCT/EP2015/081405
§ 371 (c)(1),
(2) Date: Jul. 27, 2017

(87) PCT Pub. No.: WO2016/119989
PCT Pub. Date: Aug. 4, 2016

(65) Prior Publication Data
US 2018/0024811 A1 Jan. 25, 2018

(30) Foreign Application Priority Data
Jan. 27, 2015 (EP) ...................................... 15152583

(51) Int. Cl.
*G10L 15/20* (2006.01)
*G06F 3/16* (2006.01)
(Continued)

(52) U.S. Cl.
CPC ........... *G06F 3/167* (2013.01); *G05B 19/048* (2013.01); *G06F 3/162* (2013.01); *G10L 25/51* (2013.01);
(Continued)

(58) Field of Classification Search
USPC ......................... 704/246, 247, 251, 252, 275
See application file for complete search history.

(56) References Cited

U.S. PATENT DOCUMENTS 9,185,780 B2 * 11/2015 Pijlman .............. H05B 37/0236
2006/0227640 A1 * 10/2006 Herschaft ............... H04N 7/183
365/207
(Continued)

FOREIGN PATENT DOCUMENTS

EP          2731371 A2      5/2014

*Primary Examiner* — Leonard Saint Cyr
(74) *Attorney, Agent, or Firm* — Meenakshy Chakravorty

(57) ABSTRACT

A controller for granting a user input device control of a controllable device including a receiver arranged for receiving a first sound signal recorded within a first time frame by a first sound sensor and receiving a second sound signal recorded within a second time frame by a second sound sensor located at the user input device. The controller further includes a processor arranged for determining a level of similarity between the first sound signal and the second sound signal. The processor is further arranged for granting the user input device control of the controllable device if a sufficient level of similarity has been determined. This enables the controller to determine if the user input device is in the same space as the first sound sensor, and it allows the creation of a control space of the controllable device based on the characteristics of the first sound sensor.

12 Claims, 7 Drawing Sheets

(51) Int. Cl.
*H04W 4/21* (2018.01)
*G05B 19/048* (2006.01)
*G10L 25/51* (2013.01)
*H05B 37/02* (2006.01)

(52) U.S. Cl.
CPC .......... *H04W 4/21* (2018.02); *H05B 37/0272* (2013.01); *G05B 2219/2642* (2013.01)

(56) References Cited

U.S. PATENT DOCUMENTS

| | | |
|---|---|---|
| 2011/0316451 A1 | 12/2011 | Loveland |
| 2012/0052872 A1 | 3/2012 | Do |
| 2012/0068818 A1 | 3/2012 | Mizon |
| 2012/0126724 A1* | 5/2012 | Chan .................. H05B 37/0236 315/362 |
| 2012/0215537 A1* | 8/2012 | Igarashi .................. G06F 3/167 704/249 |
| 2013/0218562 A1* | 8/2013 | Igarashi .................. G06F 3/167 704/251 |
| 2013/0308506 A1 | 11/2013 | Kim et al. |
| 2014/0106735 A1 | 4/2014 | Jackson et al. |
| 2014/0354153 A1* | 12/2014 | Pulido, Jr. .......... H05B 33/0854 315/77 |
| 2014/0376747 A1* | 12/2014 | Mullet .................. G08C 23/00 381/110 |
| 2015/0102745 A1* | 4/2015 | Pijlman .............. H05B 37/0236 315/291 |

\* cited by examiner

METHOD AND APPARATUS FOR PROXIMITY DETECTION FOR DEVICE CONTROL

CROSS-REFERENCE TO PRIOR APPLICATIONS

This application is the U.S. National Phase application under 35 U.S.C. § 371 of International Application No. PCT/EP2015/081405, filed on Dec. 30, 2015, which claims the benefit of European Patent Application No. 15152583.9, filed on Jan. 27, 2015. These applications are hereby incorporated by reference herein.

FIELD OF THE INVENTION

The invention relates to a controller, a system and a method for providing control of a device by a control device.

BACKGROUND OF THE INVENTION

The emergence of the internet of things provides humans the possibility to control devices for home, office and commercial applications. In many of these applications the controllable device is controlled via a portable control device (e.g. a smartphone or a tablet pc). The controllable devices (e.g. a lamp, a thermostat, an HVAC system, etc.) can be controlled manually or automatically. A link between the control device and the controllable device is required. Once this link has been established, the user is able to send control commands to the controllable device. One of the issues that arises is that the user remains able to control the parameters of the controllable device as long as the user is connected to the controllable device, even though the control device may not be in the same room as the controllable device. Patent application U.S.20140106735 A1 discloses a solution to this issue by a method of determining the distance of a portable control device relative to a controllable device via one or more RF beacons. The proximity between the two devices is estimated and control of the device is provided if the devices are within a predetermined proximity. This method, however, requires a plurality of RF beacons distributed throughout the environment, resulting in a complex solution to the problem.

Patent application EP 2731371 A1 discloses a data transceiving system which includes a user terminal (e.g. a tablet pc) configured to detect a sound around the user terminal and a location during a period of time and transmit information regarding the detected sound and the detected location to an external apparatus (e.g. a remote server). The external apparatus is configured to receive the information regarding the detected sound and the detected location, determine a user group based on the received information regarding the detected sound and the detected location, and transceive data relevant to the user group with the user terminal. In this system, a plurality of sounds may be detected by a plurality of user terminal, which sounds, detected during the same time peri-od, may be compared to determine that the plurality of user terminals are part of the same user group.

SUMMARY OF THE INVENTION

It is an object of the present invention to provide a controller, a system and a method for controlling a device is a less complex way.

According to a first aspect of the present invention the object is achieved by a controller for granting a user input device control of a controllable device. The controller comprises:

a receiver arranged for receiving a first sound signal recorded within a first time frame by a first sound sensor and a second sound signal recorded within a second time frame by a second sound sensor located at the user input device, and a processor arranged for determining a level of similarity between the first sound signal and the second sound signal, wherein the first time frame and the second time frame at least partially overlap, and for granting the user input device control of the controllable device if a sufficient level of similarity has been determined.

The controller uses sound comparison to determine if the user input device (e.g. a smartphone) is in the same space as the first sound sensor. The characteristics and the location of the first sound sensor determine the control area of the controllable device, and in the embodiment wherein the first sound sensor is in the same space as the controllable device, the controller is able to determine if the user input device is in the same space as the controllable device. It is advantageous to use sound comparison to determine whether the user input device is in the same space as the controllable device, because sound signals are less likely to pass through walls and windows compared to, for example, radio signals. Furthermore, using sound comparison is advantageous because it allows the creation of a control space of the controllable device based on the characteristics and the location of the first sound sensor. The characteristics of the second sound sensor further determine the control space of the controllable device because, if the control space of the first sound sensor and the control space of the second sound sensor at least partially overlap, the controller may grant the user input device control of the controllable device.

In an embodiment of the controller, the processor is further arranged for filtering at least one sound characteristic from the first sound signal and/or at least one sound characteristic from the second sound signal before determining the level of similarity. This allows the controller to determine to remove for example low frequency signals, which are less likely to be reflected and more likely to be absorbed by walls, thereby decreasing the possibility that sound from neighboring rooms is used for comparison. A further advantage of filtering sound characteristics is that it may simplify sound signal comparison, which may result in low data transmission and faster sound comparison.

In an embodiment of the controller, the processor is further arranged for determining a level of similarity between the first sound signal and the second sound signal, both comprising background sound recorded at the location of their respective sound sensors. The advantage of this embodiment is that the controller determines if the user input device is in the same space as the first sound sensor without the need for an active sound emitter. Background sound is often only audible inside the room wherein the sound source is located, thereby enabling the controller to determine if the user input device is in the same room as the first sound sensor and, in the embodiment wherein the first sound sensor is in the same space as the controllable device, the controllable device.

In an embodiment of the controller, the controller further comprises a transmitter arranged for transmitting a request signal to the first sound sensor and the second sound sensor, the request signal requesting the sound sensors to transmit the first sound signal and the second sound signal from their respective sound sensor to the controller. In this embodiment, the controller is able to select the time windows wherein the controller checks whether the user input device is present in the control space of the controllable device. This may, for example, occur periodically, or it may for example occur at the moment that the user input device is connected to the same network as the controller.

In a further embodiment of the controller, the transmitter is arranged for transmitting the request signal based on a connection request, wherein the connection request is received from the first user input device. In this embodiment, the user input device may send the connection request to the controller in order to gain control of the controllable device. The connection request may further comprise the second sound signal, or receiving the second sound signal from the user input device may be representative of the connection request. The controller may then transmit the request signal to the first sound sensor to request the first sound signal. This embodiment is advantageous because it allows the controller to grant the user input device control of the controllable device when it is requested by the user input device.

In an embodiment of the controller, the receiver is further arranged for receiving a control command from the user input device. In this embodiment, the controller is further arranged for controlling the controllable device based on the control command when control of the controllable device has been granted to the user input device. This is advantageous if the controller is comprised in, for example, a building management system, because it allows the controller to receive control commands from the user input device and control the controllable device based on the control command, if the controller has determined that the user input device is in the control space of the controllable device.

In an embodiment of the controller, the controller is further arranged for communicating to the user input device for which one or more controllable devices control has been granted. The controller may further communicate to the user input device to which devices control has not been granted. This is advantageous because it allows a user to see which devices are in the control range of the user input device and, optionally, which ones are not.

According to a second aspect of the present invention the object is achieved by a system for granting a user input device control of a controllable device, the system comprising:
  a first sound sensor,
  the controllable device, and
  controller comprising a receiver arranged for receiving a first sound signal recorded within a first time frame by the first sound sensor and a second sound signal recorded within a second time frame by a second sound sensor located at the user input device, and a processor arranged for determining a level of similarity between the first sound signal and the second sound signal, wherein the first time frame and the second time frame at least partially overlap, and for granting the user input device control of the controllable device if a sufficient level of similarity has been determined.

In an embodiment of the system, the system further comprises a speaker arranged for producing a third sound signal. The speaker may be comprised in the controller, in the controllable device, in the user input device, at the first sound sensor or in a further device. The third sound signal may be produced when, for example, insufficient background sound is present in the control space of the controllable device. In this embodiment, the processor is further arranged for determining a level of similarity between the third sound signal and the first sound signal and/or the second sound signal, and for granting the user input device control of the controllable device if a sufficient level of similarity has been determined. In a further embodiment, the third sound signal is at least partially ultrasound. The advantage of using an ultrasound third sound signal is that humans are not able to hear the sound, while the first sound sensor and the second sound sensor may be arranged for recording the ultrasound signal. A further advantage of using a produced sound signal is that the controller may be able to determine the distance between the speaker and the user input device and/or the controllable device by determining the duration whereafter the third sound signal is received by the first sound sensor and/or the second sound sensor, which may enable further options for granting the user input device control of the controllable device In an embodiment of the system, the controllable device comprises at least one light source to be controlled by the controller. In this embodiment, the controllable device may be, for example, a lighting device (e.g. an LED lamp) arranged for providing general illumination.

In an embodiment of the system, the controller may further comprise the first sound sensor. In this embodiment, the location of the controller and the characteristics of the first sound sensor determine the control space of the controllable device. This embodiment is advantageous when the controller is, for example, comprised in a home automation control system which may be, for example, located in the same space as the controllable device. Therefore, a user operating the first user input device (e.g. a smartphone) is only allowed to control the controllable device if the user is in the same space as the controller (and therewith the controllable device).

In an embodiment of the system, the controller is comprised in the user input device. This embodiment provides the advantage that the processor of the user input device may be used to perform the signal comparison, and that a transceiver/receiver of the user input device may be used to receive the first sound signal from the first sound sensor. Since the second sound signal is recorded at the user input device, the processor of the user input device may receive the second sound signal immediately. Another advantage of this embodiment is that the user input device may also provide an interface platform between the user input device, the first sound sensor and the controllable device, thereby eliminating the requirement of the controller to be able to communicate with the user input device, the first sound sensor and the controllable device. Furthermore, using the user input device as the control device reduces the complexity of the controller, thereby improving the usability of the system and reducing hardware and costs.

In an embodiment of the system, the controller is comprised in the controllable device. In this embodiment, the controller may, for example, receive a control command from the user input device and use this control command to adjust a control parameter of the controllable device. The controller may further receive, along with the control command, the second sound signal from the user input device, and, upon receiving the second sound signal, transmit a request signal to the first sound sensor to provide the first sound signal recorded in a time frame at least partially overlapping with the time frame wherein the second sound signal is recorded in order to determine whether to adjust the control parameter of the controllable device. In a further embodiment, the controller may further comprise the first sound sensor, thereby integrating the first sound sensor and the controller in the controllable device. This may reduce the complexity of the system and it may reduce hardware and costs.

According to a third aspect of the present invention the object is achieved by a method of granting a user input device control of a controllable device, the method comprising the steps of:

receiving a first sound signal recorded within a first time frame by a first sound sensor, receiving a second sound signal recorded within a second time frame by a second sound sensor located at the user input device, determining a level of similarity between the first sound signal and the second sound signal, wherein the first time frame and the second time frame at least partially overlap, and granting the user input device control of the controllable device if a sufficient level of similarity has been determined.

In embodiments of the method, an additional step may be included to control the controllable device based on a control command. The control command may be based on a user input and is executed only if control has been granted to the user input device. The control command may be received from the user input device. Additionally or alternatively, the control command may be a predefined control setting, optionally stored at the controller, which is executed if the sound signals show sufficient similarity.

BRIEF DESCRIPTION OF THE DRAWINGS

The above, as well as additional objects, features and advantages of the disclosed devices and methods, will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
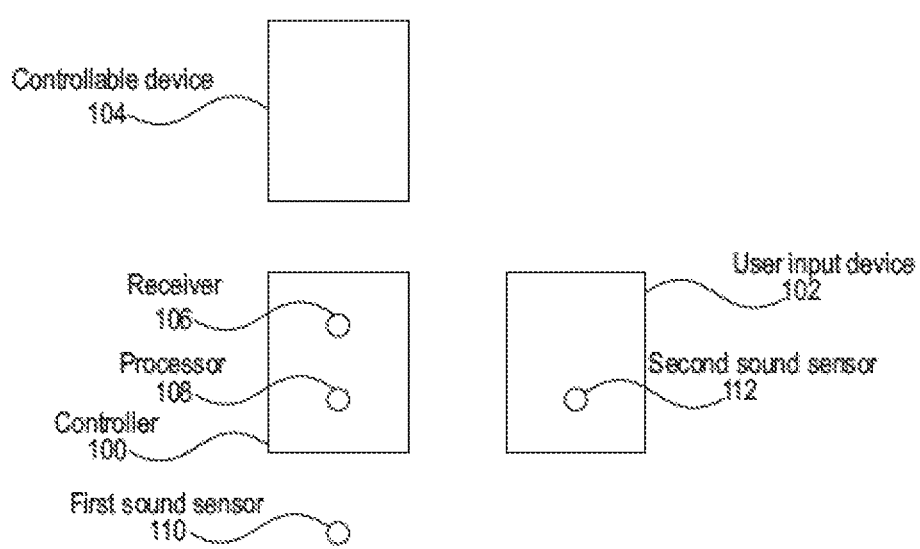
FIG. 1 shows schematically an embodiment of a system according to the invention for granting a user input device control of a controllable device.

FIG. 1 shows schematically an embodiment of a system according to the invention for granting a user input device 102 control of a controllable device 104, the system further comprising a controller 100, and a first sound sensor 110. The controller 100 comprises a receiver 106 arranged for receiving a first sound signal recorded within a first time frame by the first sound sensor 110. The receiver 106 is further arranged for receiving a second sound signal recorded within a second time frame by a second sound sensor 112 located at the user input device 102. The controller 100 further comprises a processor 108 arranged for determining a level of similarity between the first sound signal and the second sound signal, wherein the first time frame and the second time frame at least partially overlap. The processor 108 is further arranged for granting the user input device 102 control of the controllable device 104 if a sufficient level of similarity has been determined. The level of similarity that is required for granting control of the controllable device 104 may be predetermined and/or it may depend on the envisioned interaction options between the user input device 102 and the controllable device 104 (for some embodiments a 50% similarity may be sufficient, while in other embodiments a 90% similarity may be required). The controller 100 may further comprise a transmitter (not shown) to communicate to the user input device 102 that control of the controllable device 104 has been granted. The controller 100 may receive the first sound signal and the second sound signal through any wireless or wired communication system. Various wireless communication technologies that are known in the art may be used, for example Bluetooth, Wi-Fi or ZigBee. A specific wireless communication technology may be selected based on for example the power consumption of the communication driver for the wireless technology and/or the communication range of the wireless signals. Many consumer devices today are already equipped with one or more communication technologies, which is advantageous because these consumer devices may serve as an interface platform between the controller 100, the first sound sensor 110, the user input device 102 and the controllable device 104. The communication technology may be further used to communicate that the user input device 102 has been granted control of the controllable device 104. This grant may be either communicated to the controllable device 104, which enables it to receive commands from the user interface device, or to the user input device 102, which enables it to transmit a control command to the controllable device 104.

The receiver 106 of the controller 100 is arranged for receiving the first sound signal from the first sound sensor 110 (e.g. a microphone) and the second sound sensor 112 (e.g. a microphone of the user input device 102). The first sound sensor 110 is arranged for recording the first sound signal, and, optionally, arranged for communicating the first sound signal to the controller 100. The first sound sensor 110 may be a standalone microphone connected to the controller 100 via a network, be comprised in the controllable device 104 or be comprised in a further device (e.g. in a camera connected to a building management system). The second sound sensor 112 is located at the user input device 102, which may be arranged for communicating the second sound signal to the controller 100. The characteristics (location, directionality, etc.) of the first sound sensor 110 and the second sound sensor 112 determine the control space of the controllable device 104, because the user input device 102 is only able to control the controllable device 104 if the second sound signal, recorded at the user input device 102, is also recorded by the first sound sensor 110 and a sufficient level of similarity determined. The sensitivity of the first sound sensor 110 and the second sound sensor 112 may further determine the control space of the controllable device 104. Adjusting the sensitivity of either one of the sound sensors may increase or decrease the size of the control space. In an embodiment where a small control space is desired, for example for a desktop lighting device, the sensitivity of the first sound sensor 110 may be low. In a further embodiment where a large control space is desired, for example for a ceiling lighting device, the sensitivity of the first sound sensor 110 may be high. Optionally, the controller 100 and/or the user input device 102 may be further arranged for adjusting a characteristic of the first sound sensor 110 and/or the second sound sensor 112. The characteristic may be adjusted automatically, during commissioning of the controller 100 and the controllable device 104 and/or via a user input. Examples of adjustable characteristics are the directionality and/or the sensitivity of the sound sensor.

A further aspect that may influence the control space of the controllable device 104 is the location of the first sound sensor 110. It may be preferred that the first sound sensor 110 is located in the vicinity of the controllable device 104 (e.g. in the same room) and that the characteristics of the first sound sensor 110 and the sound analysis/comparison technique are selected to eliminate situations wherein sounds originating from outside the room are detected. In an embodiment, the first sound sensor 110 may be located nearby the controllable device 104, for example a controller of a heating system, wherein the space wherein the first sound sensor 110 is able to capture sound is located closely to the controller of the heating system. Therefore, a user may only be able to control the heating system with the user input device 102, for example a smartphone, if the first sound signal (recorded nearby the controller of the heating system) and the second sound signal (recorded at the smart phone) show sufficient similarities, thereby indicating that the smartphone is in the control space (i.e. in the same room) of the first sound sensor 110. In a further embodiment, the first sound sensor 110 may be located remote from the controllable device 104, for example a high-ceiling lighting device, wherein it may be required that the first sound sensor 110 creates the control space on ground level.

In a further embodiment, the controller 100 may receive a plurality of first sound signals from a plurality of first sound sensors. In this embodiment, the controllable device 104 may have multiple control spaces (each first sound sensor 110 covering a control space), which allows users to control the controllable device 104 from different locations. This is advantageous in, for example, large spaces (e.g. office spaces), where it may be desired that the controllable device 104 needs to be controlled from various locations (e.g. a projector in an office space which may be controlled from multiple desks, each desk comprising a first sound sensor 110).

The type of sound sensor for the first and/or the second sound sensor 112 may be selected in relation to the context wherein the sound sensor will be used. The envisioned interaction options between the user input device 102 and the controllable device 104 may determine the selection of a specific sound sensor. The sound sensor may for example be an omnidirectional sound sensor, thereby creating a control space with its center at the sound sensor. The first sound sensor 110 may be a cardioid sound sensor, which may be may be used to create a control space of the first sound sensor 110 to cover a part of a room. Optionally, multiple cardioid sound sensors may be used to divide a room into multiple control spaces. The first sound sensor 110 may be a parabolic sound sensor, creating a narrow sound detection beam, and therefore a directional control space. Using a parabolic sound sensor is advantageous, for example in an office space with one or more desks, wherein each desk may have its own controllable lighting device and each desk requires its own control space. Other types of sound sensors, for example subcardioid, hypercardioid or supercardioid sound sensors, or a combination of sound sensors, may be used in further embodiments.

In an embodiment, the processor 108 is further arranged for filtering at least one sound characteristic from the first sound signal and/or at least one sound characteristic from the second sound signal before determining the level of similarity. This allows the controller 100 to determine to remove for example low frequency signals, which are less likely to be reflected and more likely to be absorbed by walls, thereby removing the possibility that sound from neighboring rooms is used for comparison. This may further eliminate sounds originating from remote locations in the comparison of the first sound signal and the second sound signal. Another example is to filter sounds within a specific frequency range and/or a specific amplitude range, thereby enabling, for example, to only use sounds originating from speech for comparison. Various types of sound present in the control space of the first sound sensor 110 may be used for comparison. The processor 108 may for example be arranged for determining a level of similarity between the first sound signal and the second sound signal, wherein the first sound signal and the second sound signal comprise background sound recorded at the location of their respective sound sensors. The comparison of the first sound signal and the second sound signal may comprise the steps of: analyzing the first sound signal and analyzing the second sound signal and determining similarities between the first sound signal and the second sound signal. Various sound comparison methods that are known in the art may be used to compare the first sound signal to the second sound signal. An example of a sound comparison method is the Fast Fourier Transform analysis, wherein algorithms are used to calculate the spectral energy density of various frequencies. Algorithms may for example be used to identify echoes, identify different types of sound (for example background noise, speech or repetitive noise) and to filter at least one sound characteristic from the first sound signal and at least one sound characteristic from the second sound signal before determining the level of similarity. Another sound signal comparison method known in the art is spectrogram analysis. In this method it is for example possible to filter sound signals with high amplitude. Eliminating all sounds with low amplitudes before the comparison may result in low data transmission and faster sound comparison. The advantage of this method is its ability to compare sound signals subject to interference from objects in the physical space. The abovementioned comparison methods may be used to determine that sound has passed through a wall or through a window, for example when, after comparison, a level of similarity with a substantial difference in amplitude is detected.

The processor 108 may be further arranged for estimating the certainty of a user input device 102 being in the control space of the controllable device 104 based on the level of similarity of the sound signals. The processor 108 may be further arranged for limiting the control of the controllable device 104 based on the estimation. For example, the processor 108 may estimate a 90% certainty that a first user input device is in the control space of the controllable device 104, the controllable device 104 being for example a controller for an HVAC system, and a 20% certainty that a second user input device is in the control space of controller of the HVAC system, thereby providing full control of the HVAC system to the first user input device, and limited control of the HVAC system to the second user input device (the second user input device may only be able to, for example, make minor adjustments to the temperature in the room and be restricted from turning the HVAC system on or off).

In an embodiment, the controller 100 further comprises a transmitter arranged for transmitting a request signal to the first sound sensor 110 and the second sound sensor 112, the request signal requesting the sound sensors to transmit the first sound signal and the second sound signal to the controller 100. This allows the controller 100 to determine when to request the sound signals for comparison. The moment when the sound signals are received or requested by the controller 100 may depend on the embodiment of the controller 100. In a first example, the controller 100 may, after requesting the first and second sound signal and determining a sufficient level of similarity between the sound signals, establish a temporary connection between the user input device 102 and the controllable device 104. This may allow the user input device 102 to control the controllable device 104, for example during a predetermined time interval. When the time interval approaches its end, sound signals may again be requested and compared to refresh the grant of control. The abovementioned example uses the ending of a predetermined time interval as a trigger to request the sound signals. Other triggers may be used for requesting the sound signals. For example, a further device connected to the same network as the controller 100 may trigger transmitting the request signal. Switching on a lighting device in a room for example may be detected by or communicated to the controller 100, which may request the first sound signal from the first sound sensor 110 (located in the room) and the second sound sensor 112 from the user input device 102, for example a smart watch comprising a lighting control application for controlling the light in the room. If a sufficient level of similarity has been determined by the processor 108, the user input device 102 will be granted control of the lighting device in the room. By gaining control a user light preference setting may be communicated to the lighting device or the user may provide a user input via the smartwatch in order to adjust the light output. Additionally or alternatively, the detection of a user input device 102 in the same network as the controller 100 may be a trigger for transmitting the request signal to determine the location of the user input device 102 relative to one or more first sound sensors 110. Additionally or alternatively, an application related to controlling the controllable device 104 running on the user input device 102 may transmit the second sound signal to the controller 100, whereafter the controller 100 may transmit the request signal for the first sound signal to the first sound sensor 110.

In a further embodiment, the transmitter is arranged for transmitting the request signal based on a connection request, wherein the connection request is received from the first user input device 102. In this embodiment, the user input device 102 may send the connection request to the controller 100 in order to gain control of the controllable device 104. The connection request (i.e. the trigger to request the first sound signal from the first sound sensor 110) may further comprise the second sound signal. The abovementioned examples of triggers for transmitting the request command are examples, and those skilled in the art will be able to design many alternative triggers without departing from the scope of the appended claims.

In an embodiment, the system further comprises a speaker arranged for producing a third sound signal. The speaker may be comprised in the controller, in the controllable device, in the user input device, at the first sound sensor or in a further device. The processor 108 may be further arranged for comparing the first sound signal and/or the second sound signal with the third sound signal, and for granting the user input device 102 control of the controllable device 104 if a sufficient level of similarity between the sound signals has been determined. The third sound signal may be an audible, an infrasound or an ultrasound sound signal. Emission of the third sound signal by the speaker may be requested by the processor 108 of the controller 100 upon receiving any of the abovementioned triggers (e.g. upon detecting the user input device 102 in the network, upon running an application on the user input device 102, upon receiving a control command from the user input device 102, etc.). The processor 108 of the controller 100 may be further arranged for determining the duration whereafter the third sound signal is received by the first sound sensor 110 and the second sound sensor 112. This further allows the processor 108 of the controller 100 to determine the distance between the speaker and the first and/or the second sound sensor 112 based on the determined duration. This may be further used to determine the maximum control range (i.e. the distance between the first sound sensor 110 and the second sound sensor 112) wherein the user input device 102 may control the controllable device 104. In another embodiment, the speaker may be arranged for emitting an identifier embedded in the third sound signal. The identifier may comprise for example a code representative of the space (e.g. room number) or representative of the controllable device 104 within the space, thereby allowing the processor 108 to, after sound comparison, determine that the user input device 102 is in the control space of a specific controllable device 104.

In a further embodiment, the controllable device 104 comprises at least one light source arranged for providing general illumination. In this embodiment, the user input device 102 may be further arranged for controlling a control parameter of the at least one light source of the controllable device 104. The controllable device 104 may for example be a lighting device (e.g. a Philips Hue bulb, a TLED, an LED lamp, etc.). An application may run on the user input device 102, the application may comprise a user interface which allows user input, which may be used to control, for example, the control parameter of the at least one light source.

Figure 2:
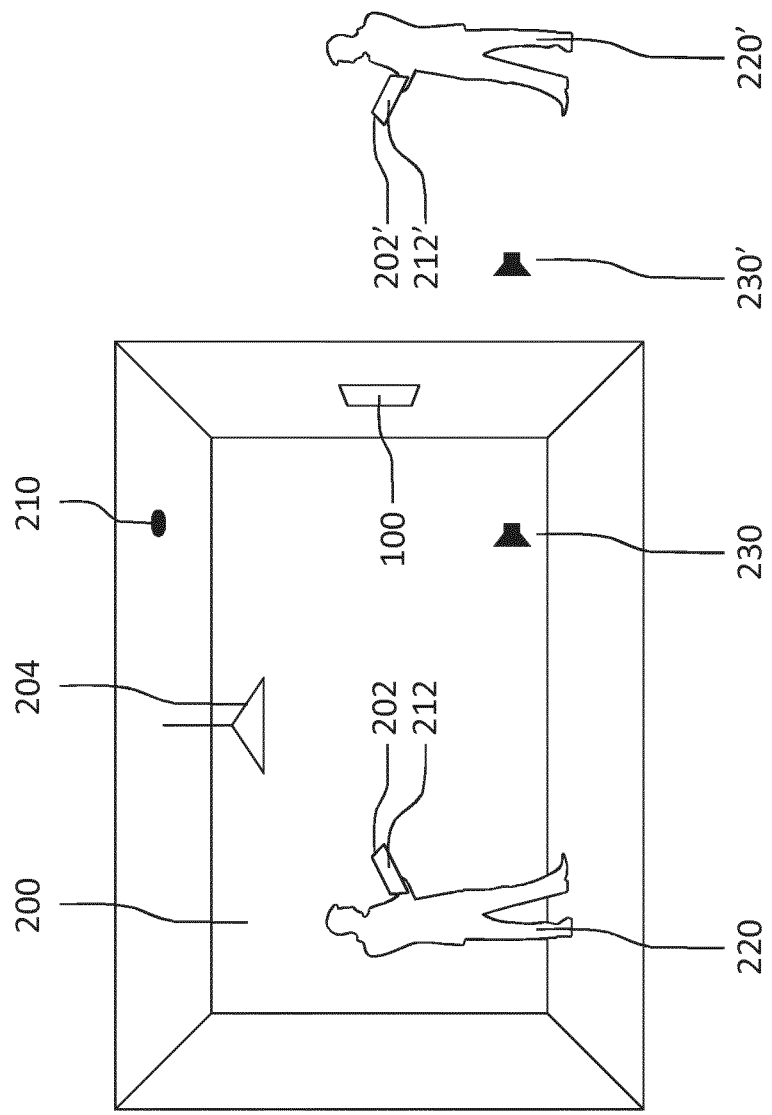
FIG. 2 shows schematically an embodiment of a system according to the invention for granting a first user input device control of a controllable device, and not granting a second user input device control of the controllable device.

FIG. 2 shows schematically an embodiment of a system according to the invention for granting a first user input device 202 control of a controllable device 204, and not granting a further user input device 202' control of the controllable device 204. FIG. 2 shows an interior of a room 200, the room 200 comprising the controller 100, the first sound sensor 210, a lighting device 204 (i.e. the controllable device), a first user 220 with a first user input device 202 (e.g. a tablet pc) comprising the second sound sensor 212, which are all connected via a network (not shown). The figure further shows, outside the room, a further user 220' with a further user input device 202' (e.g. a smartphone) comprising a further second sound sensor 212', which are also connected via the network. The figure also shows an indication of a first (background) sound 230 inside the room 200, and an indication of a further (background) sound 230' outside the room. In this embodiment, the first sound sensor 210 records a first sound signal, the second sound sensor 212 records a second sound signal and the further sound sensor 212' records a further sound signal, wherein the sound signals comprise (background) sound 230, 230' recorded at their respective location. In the example of FIG. 2, the range of the first sound sensor 210 covers the room 200, therefore the control space of the lighting device 204 (i.e. the controllable device) also covers the room 200. The range of the second sound sensor 212 and the range of the further sound sensor 212' are dependent on the sound sensors 212, 212' of their respective user input devices 202, 202'. The processor of the controller 100 receives the first, the second and the further sound signals via the network and compares them in order to determine if the sound signals show similarities, thereby determining if the sound signals were recorded in the same space. In this example, the processor may determine that the first user input device 202 is in the control space of the lighting device 204 because the first sound signal and the second sound signal show sufficient similarities, and control of the lighting device 204 may be granted to the first user input device 202. The first sound signal and the further sound signal show no or limited similarities. Therefore, the processor of the controller 100 may determine that the further user input device 202' is not in the control space of the lighting device 204 and it may determine to not grant the further user input device 202' control of the lighting device 204, thereby excluding the second user 220' from controlling the lighting device 204. The configuration of FIG. 2 is an example, and those skilled in the art will be able to design many alternative configurations without departing from the scope of the appended claims.

Figure 3:
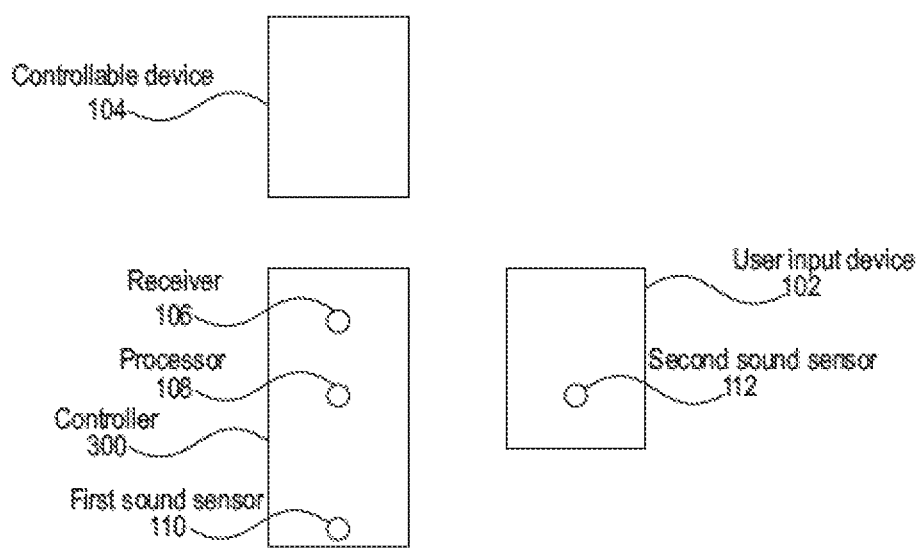
FIG. 3 shows schematically an embodiment of a system according to the invention for granting a user input device control of a controllable device, wherein the controller comprises the first sound sensor.

FIG. 3 shows schematically an embodiment of a system according to the invention for granting the user input device 102 control of the controllable device 104, wherein the controller 300 comprises the first sound sensor 110. In this embodiment, the location of the controller 300 and the characteristics of the first sound sensor 110 determine the control space of the controllable device 104. This embodiment is advantageous when the controller 300 is, for example, comprised in a home automation control terminal located in the same space as the controllable device 104. The controllable device 104 may be, for example, an air-conditioning device arranged to be controlled by the home automation control terminal, which may be only controlled by a user located in the same space as the air-conditioning device. The home automation control terminal may receive a control command and the second sound signal from the user input device 102, whereafter it compares the second sound signal with the first sound signal (recorded by, for example, a microphone comprised in the home automation control terminal), thereby determining if the user input device 102 is located in the same space as the home automation control terminal, and therewith in the same space as the air-conditioning device. Therefore, a user operating the first user input device (e.g. a smartphone) may be only allowed to control the air-conditioning device if the user is in the same space as the home automation control terminal.

Figure 4:
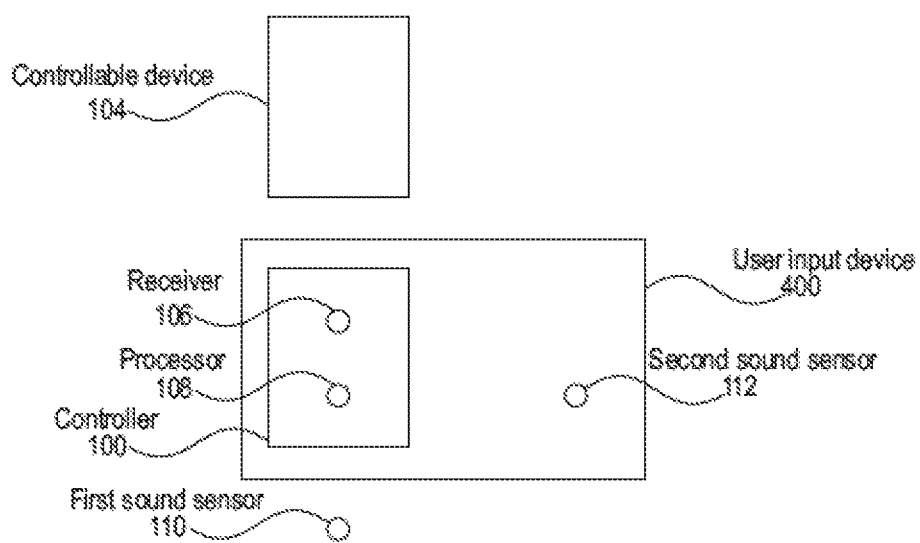
FIG. 4 shows schematically an embodiment of a system according to the invention for granting a user input device control of a controllable device, wherein the controller is comprised in the user input device.

FIG. 4 shows schematically an embodiment of a system according to the invention for granting a user input device 400 control of the controllable device 104, wherein the controller 100 is comprised in the user input device 400. This embodiment allows the processor of the user input device 400, for example a smart watch, to determine the level of similarity between the first sound signal and the second sound signal (recorded at the smart watch), and that a transceiver/receiver of the smart watch may be used to receive the first sound signal from the first sound sensor 110. If the processor of the smart watch determines a sufficient level of similarity between the first sound signal and the second sound signal, the smart watch may be able to control the controllable device 104 (e.g. opening an electronic door), which may occur automatically if the sound signals show a sufficient level of similarity or via a user input command received at a user interface (e.g. a touch-screen) of the smart watch. An advantage of using a user input device 400 for sound comparison is that the user input device 400 may also provide an interface platform between the user input device 400, the first sound sensor 110 and the controllable device 104.

Figure 5:
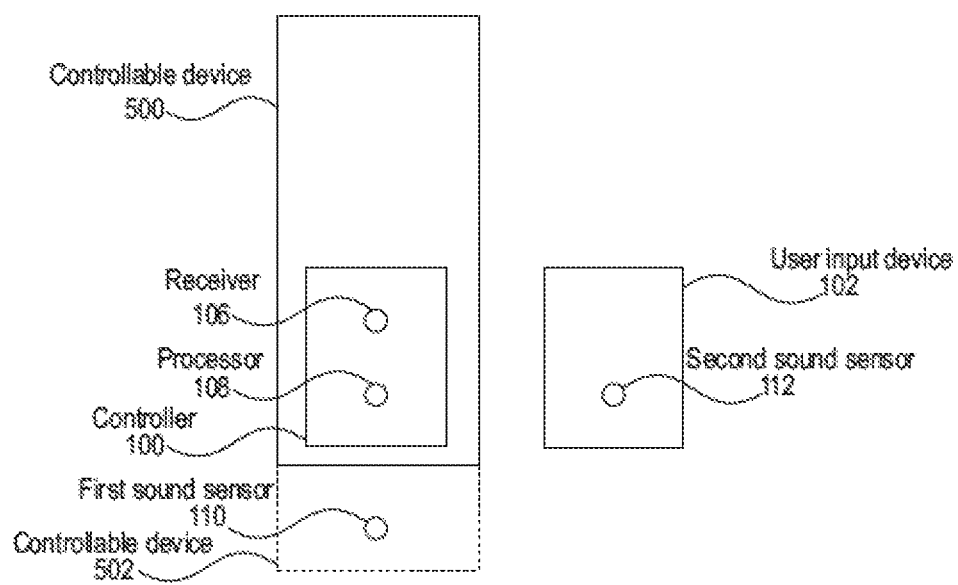
FIG. 5 shows schematically an embodiment of a system according to the invention for granting a user input device control of a controllable device, wherein the controller is comprised in the controllable device.

FIG. 5 shows schematically an embodiment of a system according to the invention for granting the user input device 102 control of the controllable device 104, wherein the controller 100 is comprised in the controllable device 500. The controller 100 may be comprised in, for example, a home sound system, and it may receive a control command (e.g. a command to increase the volume) from the user input device 102 (e.g. a laptop). The controller may further receive, along with the control command, the second sound signal recorded by a microphone of the laptop, and, upon receiving the second sound signal, transmit a request signal to the first sound sensor 110 to request the first sound signal recorded in a time frame at least partially overlapping with the time frame wherein the second sound signal is recorded in order to determine whether to increase the volume of the home sound system. In a further embodiment, the controllable device 502 may further comprise the first sound sensor 110. For example, the controller 100 may be comprised in a lighting device that comprises the first sound sensor 110. This lighting device may be controlled by the user input device, as long as the controller 100 in the lighting device determines a sufficient level of similarity between the recorded first sound signal and the second sound signal received from the user input device 102.

Figure 6:
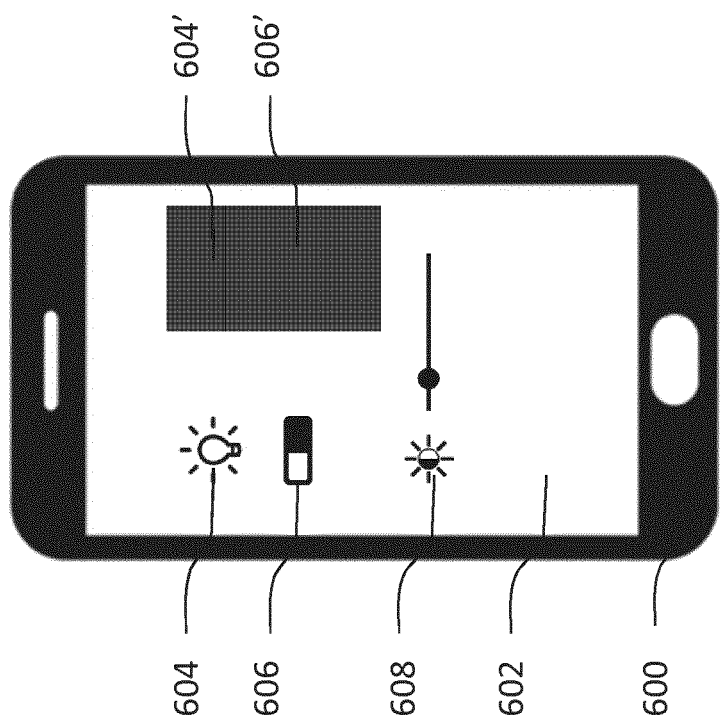
FIG. 6 shows schematically an embodiment of a user interface of a user input device indicating if the user is able to control a lighting device.

In an embodiment, the controller 100 is further arranged for communicating to the user input device 102 for which one or more controllable devices 104 control has been granted. Optionally, the controller 100 is further arranged for communicating to the user input device 102 to which one or more controllable devices 104 control has not been granted. The controller 100 may be, for example, able to communicate to the user which controllable devices 104 are in the same network as the user input device 102 and which ones may be controlled by the user input device 102 based on the sufficient level of similarity between the first and second sound signal. An example of this embodiment is illustrated in FIG. 6. FIG. 6 shows schematically an embodiment of a user interface 602 of a user input device 600 indicating if the user is able to control a lighting device 604, 604'. In this embodiment, the user interface 602 provides information about the connection between the user input device 600 and a plurality of lighting devices 604, 604'. In this example, the user interface shows the lighting devices 604, 604' that are connected to the same network as the user input device 600. A black lamp icon illustrates that the user input device 600 is located in the control space of a lighting device 604 and a grey lamp icon illustrates that the user input device 600 is not located in the control space of a lighting device 604'. The user interface further shows the parameters that may be adjusted by the user, in this example an on/off setting 606, 606' and a brightness setting 608.

Figure 7:
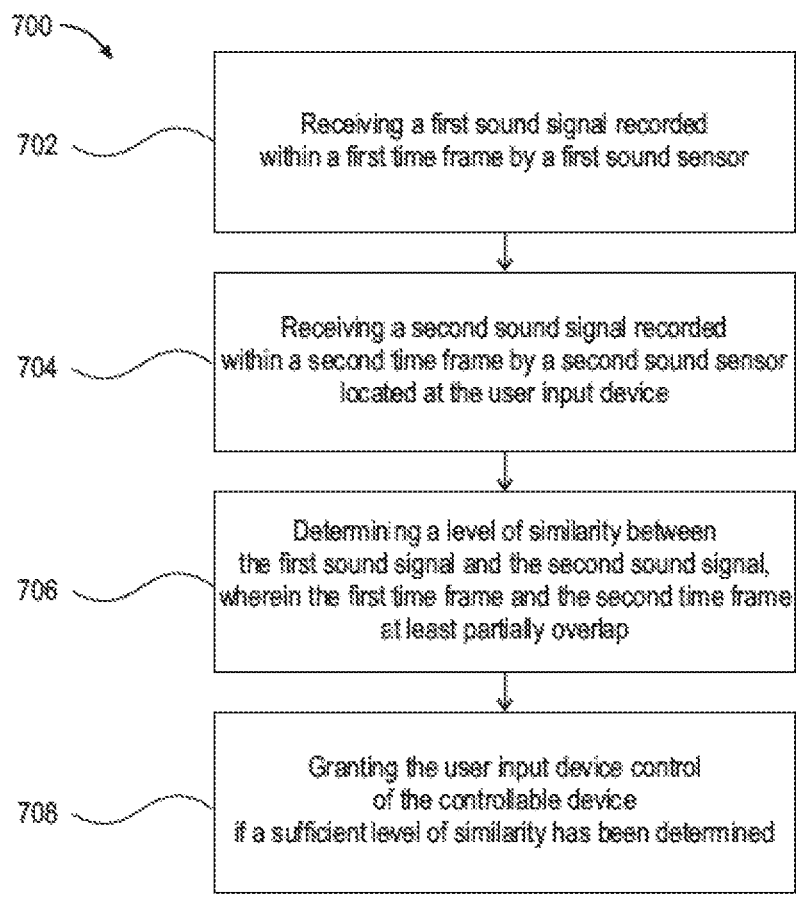
FIG. 7 shows schematically and exemplary a method of granting a user input device control of a controllable device.

FIG. 7 shows schematically and exemplary a method 700 according to the invention of granting a user input device 102 control of a controllable device 104. The method 700 comprises the following steps:

receiving 702 a first sound signal recorded within a first time frame by a first sound sensor 110, receiving 704 a second sound signal recorded within a second time frame by a second sound sensor 112 located at the user input device 102, determining 706 a level of similarity between the first sound signal and the second sound signal, wherein the first time frame and the second time frame at least partially overlap, and granting 708 the user input device 102 control of the controllable device 104 if a sufficient level of similarity has been determined.

In a further embodiment the method 700 of FIG. 7 comprises the additional steps of receiving a user input (for example at the user input device 102), generating a control command based on the user input and controlling the controllable device 104 based on the control command when control of the controllable device 104 has been granted to the user input device 102.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A controller for granting a user input device control of a lighting device comprising at least one light source, the controller comprising:
    a receiver arranged for receiving a first sound signal recorded within a first time frame by a first sound sensor and a second sound signal recorded within a second time frame by a second sound sensor located at the user input device, and for receiving a control command based on user input from the user input device, and
    a processor arranged for determining a level of similarity between the first sound signal and the second sound signal, and for determining, based on the level of similarity, whether the first and second sound signals were recorded in the same control space of the lighting device, wherein the first time frame and the second time frame at least partially overlap, and for granting the user input device control of the lighting device if a sufficient level of similarity has been determined,
    wherein the controller is further arranged for controlling the lighting device based on the control command when control of the lighting device has been granted to the user input device.

2. The controller of claim 1, wherein the processor is further arranged for filtering at least one sound characteristic from the first sound signal and/or at least one sound characteristic from the second sound signal before determining the level of similarity.

3. The controller of claim 1, wherein the controller further comprises a transmitter arranged for transmitting a request signal to the first sound sensor and/or the second sound sensor, the request signal requesting the sound sensors to transmit the first sound signal and the second sound signal to the controller.

4. The controller of claim 3, wherein the receiver is further arranged for receiving a connection request from the user input device for connecting to the lighting device, and wherein the transmitter is arranged for transmitting the request signal based on the connection request.

5. The controller of claim 1, wherein the controller is further arranged for communicating to the user input device for which one or more lighting devices control has been granted.

6. A system for granting a user input device control of a lighting device comprising at least one light source, the system comprising:
    a first sound sensor,
    the lighting device, and
    a controller comprising a receiver arranged for receiving a first sound signal recorded within a first time frame by the first sound sensor and a second sound signal recorded within a second time frame by a second sound sensor located at the user input device, and for receiving a control command based on user input from the user input device,
    and a processor arranged for determining a level of similarity between the first sound signal and the second sound signal, and for determining, based on the level of similarity, whether the first and second sound signals were recorded in the same control space of the lighting device, wherein the first time frame and the second time frame at least partially overlap, and for granting the user input device control of the lighting device if a sufficient level of similarity has been determined,
    wherein the controller is further arranged for controlling the lighting device based on the control command when control of the lighting device has been granted to the user input device.

7. The system of claim 6, wherein the system further comprises a speaker arranged for producing a third sound signal, and wherein the processor is further arranged for determining a level of similarity between the third sound signal and the first sound signal and/or the second sound signal, and for granting the user input device control of the controllable lighting device if a sufficient level of similarity has been determined.

8. The system of claim 6, wherein the controller comprises the first sound sensor.

9. The system of claim 6, wherein the controller is comprised in the user input device.

10. The system of claim 6, wherein the controller is comprised in the lighting device.

11. A method of granting a user input device control of a lighting device, the method comprising the steps of:
    receiving a first sound signal recorded within a first time frame by a first sound sensor,
    receiving a second sound signal recorded within a second time frame by a second sound sensor located at the user input device,
    determining a level of similarity between the first sound signal and the second sound signal, and based on the level of similarity, determining whether the first and second sound signals were recorded in the same control space of the lighting device, wherein the first time frame and the second time frame at least partially overlap, and granting the user input device control of the lighting device if a sufficient level of similarity has been determined, the method further comprising the steps of:

receiving a control command from the user input device based on user input, and controlling the lighting device based on the control command when control of the lighting device has been granted to the user input device.

12. The method of claim 11, wherein the first sound signal and the second sound signal comprise background sound recorded at the location of their respective sound sensors.

* * * * *